United States Patent [19]

Krammer

[11] 3,744,570
[45] July 10, 1973

[54] CULTIVATOR
[76] Inventor: Kelly A. Krammer, Box 144, Cupar, Saskatchewan, Canada
[22] Filed: Nov. 1, 1971
[21] Appl. No.: 194,134

[52] U.S. Cl.................. 172/310, 172/462, 172/488
[51] Int. Cl....................... A01b 49/00, A01b 63/00
[58] Field of Search.................... 172/621, 635, 675, 172/669, 672, 491, 151, 720, 724, 148, 149, 155, 462, 488, 667, 491, 643, 310, 182, 668, 313, 314

[56] References Cited
UNITED STATES PATENTS
3,470,965 10/1969 Quickstad........................... 172/311
3,337,242 8/1967 Richardson...................... 172/311 X
3,322,202 5/1967 VanSickle et al............... 172/310 X FOREIGN PATENTS OR APPLICATIONS
28,078 12/1913 Great Britain..................... 172/462

Primary Examiner—Robert E. Pulfrey
Assistant Examiner—Stephen C. Pellegrino
Attorney—S. G. Ade et al.

[57] ABSTRACT

A rectangular frame carries front and rear pairs of cultivator shanks pivotally connected to the frame with the depth of the cultivating implements being controlled by the wheels. A ground wheel is journalled to a fork which in turn is also pivotally connected to the frame and situated between each pair of cultivating shanks. A balance bar is pivoted intermediate the ends thereof to the frame and engages a cross member of adjacent front and rear wheels thus maintaining the wheels in contact with the ground at all times regardless of the unevenness of the terrain.

8 Claims, 9 Drawing Figures

INVENTOR.
Kelly A. Krammer
BY
Kent v Ade

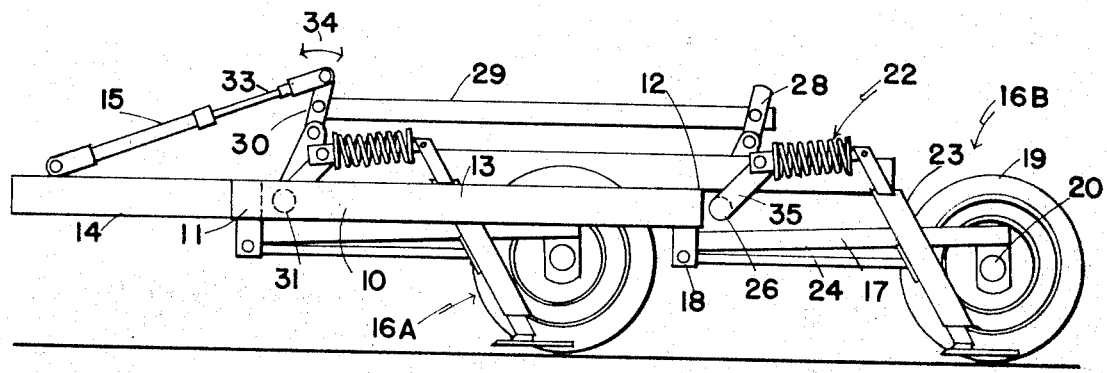

3,744,570
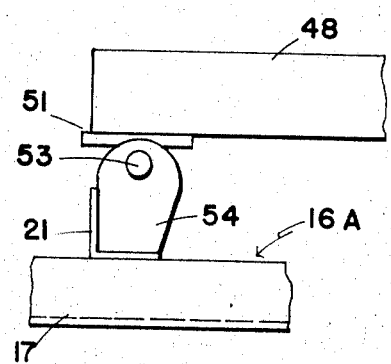
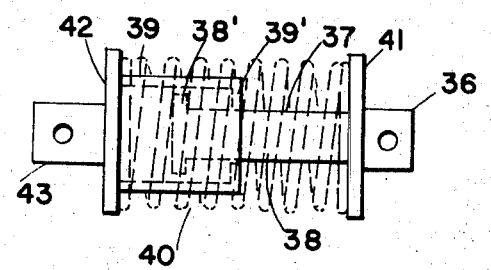
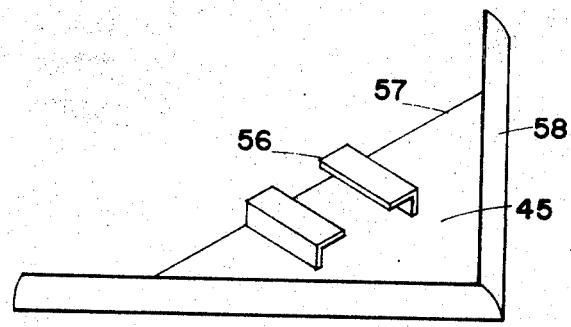
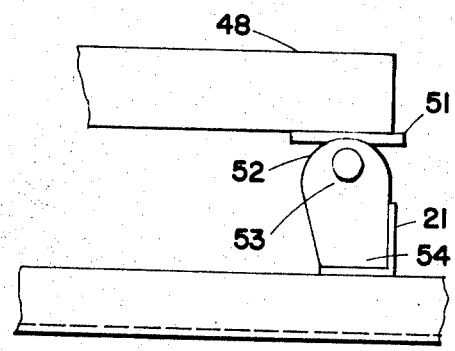
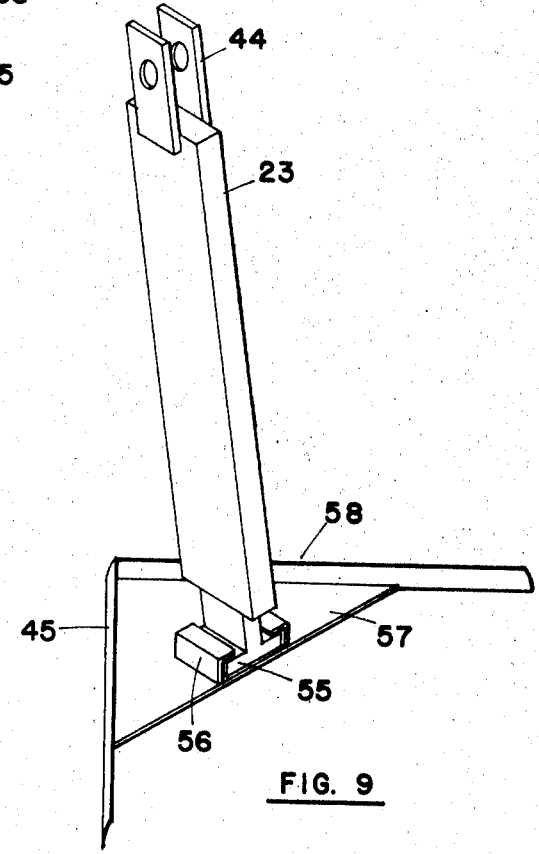
INVENTOR.
KELLY A. KRAMMER
BY
Kent & Ade

CULTIVATOR

BACKGROUND OF THE INVENTION

Conventional cultivators, particularly of the duck foot type as contrasted with one-way disc type cultivators, are reasonably efficient when used on perfectly level ground with a relatively standard consistency of density. However, such conditions are rearely met inasmuch as the consistency varies and the majority of fields undulate to a greater or lesser extent or contain small gulleys, depressions, small slough and the like. The effect of these imperfections is to make it difficult to maintain a standard depth of penetration of the cultivating implements inasmuch as if one ground engaging wheel runs into a depression, the frame tips thus upsetting the degree of penetration of the various cultivating implements. In fact under certain adverse conditions, particularly when shall cultivating, the cultivating implements may leave the ground completely for a short time.

SUMMARY OF THE INVENTION

The present invention overcomes these disadvantages by providing interconnection between the ground engaging wheels and the cultivating implements and by the provision of a rocking or balance bar situated between adjacent front and rear wheel assemblies. Under these conditions, the raising or lowering of one wheel due to ground imperfections causes a similar raising or lowering of the cultivating implement upon either side thereof and at the same time the balance bar initiates a reverse movement upon the opposite wheel assemblies and cultivating implements.

Another object of the invention is to provide a device of the character herewithin described in which the initial penetration of the cultivating implements can be controlled by the wheels within limits.

A yet further object of this invention is to provide a device of the character herewithin described in which the depth of penetration is maintained at a constant level despite imperfections of the ground due to the interconnection of the cultivating assemblies with the wheel assemblies.

Another object of the invention is to provide a device of the character herewithin described which includes a novel shovel design which will function at a variable pitch thus enabling the shovel to operate efficiently at variable elevations.

A still further object of the invention is to provide a device of the character herewithin described which is simple in construction, economical in manufacture, and otherwise well suited to the purpose for which it is designed.

With the considerations and inventive objects herein set forth in view, and such other or further purposes, advantages, or novel features as may become apparent from consideration of this disclosure and specification, the present invention consists of the inventive concept which is comprised, embodied, embraced, or included in the method, process, construction, composition, arrangement or combination of parts, or new use of any of the foregoing, herein exemplified in one or more specific embodiments of such concept.

DESCRIPTION OF THE DRAWINGS

FIG. 2 is a side elevation of the device.

FIG. 3 is a fragmentary rear end elevation of the device.

FIG. 4 is a fragmentary side elevation showing the mounting of the wheels and cultivator shanks.

FIG. 5 is a fragmentary side elevation showing one end of the rocker arm.

FIG. 6 is an enlarged fragmentary side elevation showing the compression spring connection between the shank and frame.

FIG. 7 is an enlarged fragmentary side elevation of the other end of the rocker arm.

FIG. 8 is an isometric view of one of the shovels per se.

FIG. 9 is an isometric view of one of the shank arms with the shovel attached.

In the drawings like characters of reference indicate corresponding parts in the different figures.

DETAILED DESCRIPTION

Figure 1:
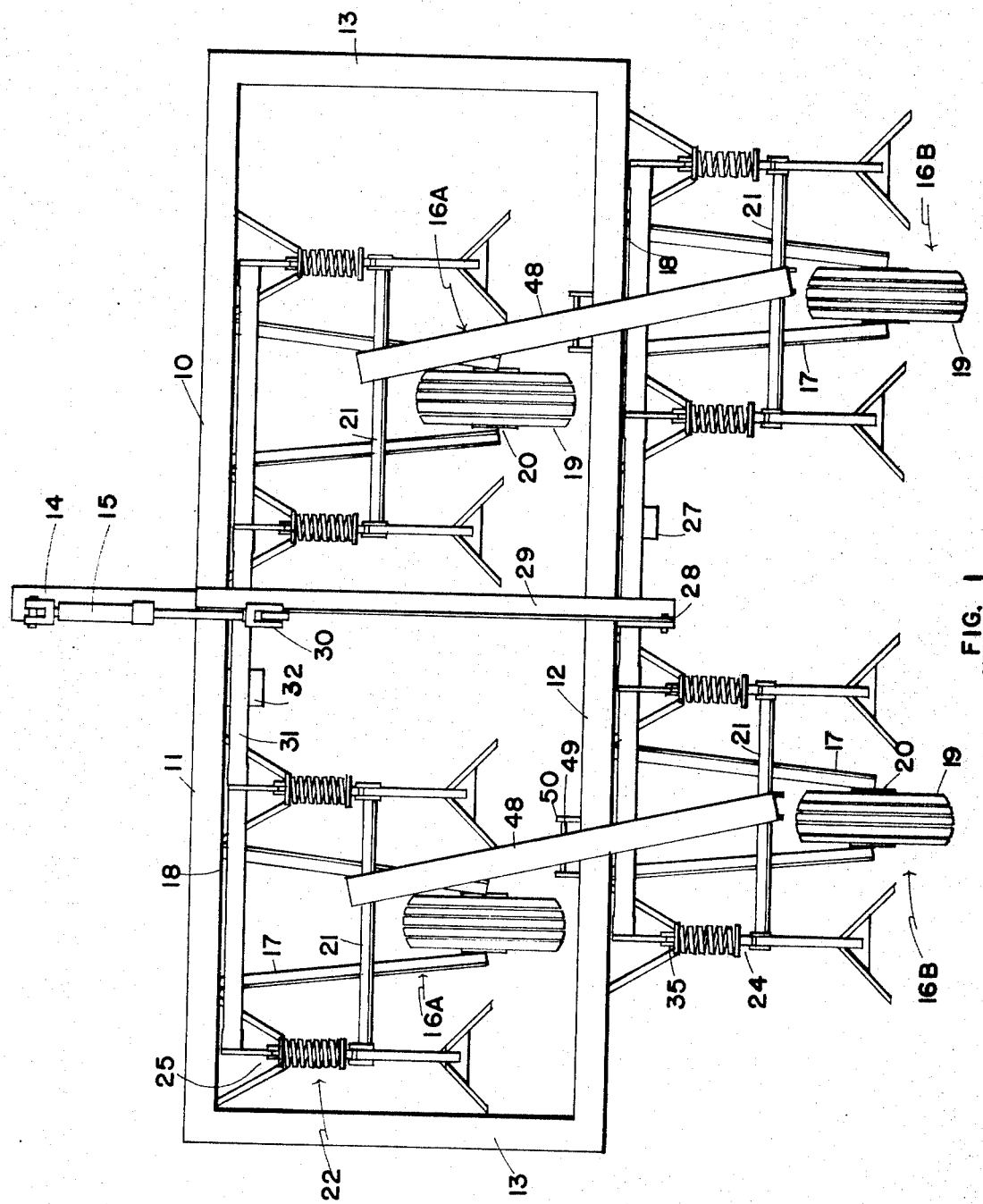
FIG. 1 is a top plan view of the device.

Proceeding therefore to describe the invention in detail, reference should be made to the accompanying drawings in which 10 illustrates a substantially rectangular frame made from square cross sectioned tubing and including a front longitudinal member 11, a rear longitudinal member 12 and a pair of transverse or cross members 13 extending between the ends of the longitudinals 11 and 12.

A tow bar 14 extends forwardly of the front longitudinal 11, and enables the device to be towed behind a source of power in the form of a tractor (not illustrated) which may also supply a source of fluid pressure to a piston and cylinder assembly 15 mounted upon the tow bar 14, the purpose of which will hereinafter become apparent.

Front ground engaging wheel assemblies 16A and rear wheel engaging assemblies 16B are provided, each wheel assembly including a fork 17 consisting of a pair of members pivotally secured by the front ends thereof to the frame within lugs 18 depending from the front and rear longitudinal members 11 and 12.

A ground engaging wheel and tire component 19 is journalled for rotation upon a spindle or axle 20 extending between the trailing ends of the arms or members 17. A cross bar 21 is welded across the arms or members 17 between the ends thereof or between the wheels 19 and the frame members 11 or 12 and the extremities of this cross bar extend beyond the members 17 as clearly shown in FIG. 1.

A cultivating assembly collectively designated 22 is situated upon each side of each of the wheel assemblies and each cultivating assembly consists of a shank 23 mounted in trailing pivotal relationship to the frame members 11 or 12 by means of a solid trailing link 24 which is welded by one end thereof to the shank 23 intermediate the ends thereof. The opposite end is bifurcated (not illustrated) and is pivotally secured to lugs 25 depending from the frame members 11 and 12 and in alignment with the aforementioned lugs 18 so that the axis of pivotal connection of the member 24 is similar to the axis of pivotal connection of the fork or wheel members 17.

A rock shaft 26 is journalled within bearings 27 in turn secured to the front longitudinal member 11 and this rock shaft is provided with an arm 28 extending upwardly therefrom. A link 29 is pivotally connected to this arm and to a further arm 30 which extends upwardly from a further rock shaft 31 journalled within bearings 32 which are in turn mounted upon the rear longitudinal frame member 12.

The piston rod 33 of the piston and cylinder assembly 15 is also pivotally connected to arm 30 so that extension or retraction of the piston and cylinder assembly 15 will cause the arm 30 to move in the direction of double headed arrow 34 and, due to the link 29, will cause the arm 28 also to move in the direction of double headed arrow 34. The movement of arms 28 and 30 rotates rock shafts 26 and 31 concurrently and each of these rock shafts is provided with a shank operating arm 35 adjacent each cultivating assembly 22. A lug 36 is pivotally connected to the arms 35, said lug forming part of a telescopic rod assembly 37, one portion 38 of which slides within the other portion 39. A heavy duty compression spring 40 reacts between plates 41 and 42 on the portions 38 and 39 and normally maintains them in the extended position. A further lug 43 is connected to the portion 39 and this lug 43 is pivotally connected between a pair of lugs 44 secured to the upper end of the aforementioned shank 23 as clearly shown in FIG. 9.

It will therefore be appreciated that rotation of the arms 28 and 30 to the right with respect to FIG. 2, will compress spring 40 thus causing the shank 23 to pivot around an arc defined by shank link or arm 24 and will thus raise and lower the cultivating implements 45 situated on the lower end of the shanks 23, details of which will subsequently be described.

It will be noted from FIG. 6, that portion 38 cannot disengage from portion 39 due to the headed end 38' engaging the inturned end 39' so that movement of the arms 28 and 30 in the opposite direction to that hereinbefore described, will raise the cultivator shanks to the position shown in FIGS. 2 and 4.

However, under normal condition, offstanding lugs 46 which are provided adjacent the upper end of the shanks 23, engages adjustable stops 47 situated upon the ends of the cross bar 21 which extend beyond arms or members z7 of the wheel forks. From the foregoing, it will be appreciated that when the cultivating implements are penetrating the soil, and the wheel 19 raises relative to the frame due to a hummock on the surface, the adjustable stops 47 will lift the cultivators up by a similar amount due to the engagement of the lugs 46 with the stops 47. By the same token, if wheel 19 enters a depression in the ground surface then the compression springs 40 will force the cultivator deeper thus maintaining the lug 46 in contact with the stop 47 and maintaining the cultivating implement 45 at a constant depth relative to the surface of the soil.

However, uneven ground can tip the machine and cause disruption of the desired depth of penetration of various cultivating shovels if one or more of the wheels leaves the ground, and to avoid this is provided a balance or rocker arm 48. There is one balance or rocker arm for each adjacent front and rear wheel assemblies 16A and 16B and each balance or rocker arm consists of a beam pivoted intermediate the ends thereof upon the upper side of the frame by means of a pivot pin 49 engaging through the rocker arm and through lugs 50 extending from the frame members 11 and 12.

A pad 51 is secured to the underside of each end of the rocker or balance arm 48 and this pad engages a roller 52 journalled upon a pivot pin 53 carried within lugs 54 which in turn extend upwardly from the aforementioned cross bars or members 21. FIG. 5 shows the configuration of the rocker arm engagement with the rear wheel assemblies 16B and FIG. 7 shows a similar engagement of the opposite end of the rocker or balance arm with the front assembly 16A.

From the foregoing, a raising or lowering of one of the rear wheel assemblies 16B will cause an opposite lowering or raising of the corresponding front wheel assembly 16A thus tending to maintain the frame relatively level and to balance out the depth of penetration of the front and rear cultivating implements 45.

A T-shaped portion 55 is provided on the lower end of shanks 23 and the cultivating implement 45 is provided with a pair of spaced and parallel angle iron portions 56 secured to a transverse web 57, which engage the T-bar or part 55 as clearly shown in FIG. 9 thus detachably securing the cultivating implement to the cultivator shank 23. A flanged blade portion 58 is secured to each of the front side edges of the web 57 and diverge together as clearly shown thus making a V-shaped shovel which is particularly suitable for use in cultivating with the instant device.

However, it will be appreciated that other forms of cultivating implements can be secured to the lower end of the shanks 23 such as chisel points, duck-foot shovels and the like.

Various modifications can be made within the scope of the inventive concept which is herein disclosed and/or claimed.

What I claim as my invention is:

1. A cultivator comprising in combination a substantially rectangular frame and a tow bar extending forwardly from the front side thereof, front and rear pairs of cultivator shanks each pivotally mounted upon said frame, a cultivating implement on each of said shanks, and front and rear ground engaging wheel assemblies also pivotally mounted to said frame between each front and rear pairs of cultivator shanks respectively, and a balance bar pivoted intermediate the ends thereof to said frame and engaging adjacent front and rear wheel assemblies by the ends thereof, means secured to and extending between the wheel assemblies of each pair of said wheel assemblies, the ends of said balance bar engaging said means between adjacent front and rear pairs of wheel assemblies whereby vertical movement in one direction of said means between one pair of wheel assemblies causes vertical movement in the other direction of said means between the other of said pair of wheel assemblies.

2. The cultivator according to claim 1 wherein the engagement of said balance bar upon said means between said wheel assemblies comprises a rolling engagement of said ends of said balance bar with said means.

3. The cultivator according to claim 1 in which each of said wheel assemblies includes a fork pivoted to said frame by the one end thereof and a wheel journalled for rotation in the distal ends of said fork, said means including bar means spanning said fork between the ends thereof, and being secured thereto, said balance bar engaging upon said bar means by the ends thereof.

4. The cultivator according to claim 2 in which each of said wheel assemblies includes a fork pivoted to said frame by the one end thereof and a wheel journalled for rotation in the distal ends of said fork, said means including bar means spanning said fork between the ends thereof, and being secured thereto, said balance bar engaging upon said bar means by the ends thereof.

5. The cultivator according to claim 1 in which each of said cultivator shanks includes a compression spring pressure control assembly, means on said frame for increasing and decreasing the spring pressure thereof thereby controlling the initial penetration of said cultivating implements, and adjustable means on said shank coacting with means on said wheel assembly whereby the vertical swinging movement of one of said wheel assemblies due to uneven ground and the like raises and lowers the cultivator shank upon each side thereof, and raises and lowers the contacting end of said balance bar.

6. The cultivator according to claim 2 in which each of said cultivator shanks includes a compression spring pressure control assembly, means on said frame for increasing and decreasing the spring pressure thereof thereby controlling the initial penetration of said cultivating implements, and adjustable means on said shank coacting with means on said wheel assembly whereby the vertical swinging movement of one of said wheel assemblies due to uneven ground and the like raises and lowers the cultivator shank upon each side thereof, and raises and lowers the contacting end of said balace bar.

7. The cultivator according to claim 3 in which each of said cultivator shanks includes a compression spring pressure control assembly, means on said frame for increasing and decreasing the spring pressure thereof thereby controlling the initial penetration of said cultivating implements, and adjustable means on said shank coacting with means on said wheel assembly whereby the vertical swinging movement of one of said wheel assemblies due to uneven ground and the like raises and lowers the cultivator shank upon each side thereof, and raises and lowers the contacting end of said balance bar.

8. The cultivator according to claim 4 in which each of said cultivator shanks includes a compression spring pressure control assembly, means on said frame for increasing and decreasing the spring pressure thereof thereby controlling the initial penetration of said cultivating implemenets, and adjustable means on said shank coacting with means on said wheel assembly whereby the vertical swinging movement of one of said wheel assemblies due to uneven ground and the like raises and lowers the cultivator shank upon each side thereof, and raises and lowers the contacting end of said balance bar.

* * * * *